United States Patent [19]

Smith

[11] Patent Number: 4,976,417
[45] Date of Patent: Dec. 11, 1990

[54] WRAP SPRING END ATTACHMENT ASSEMBLY FOR A TWISTED ROPE TORSION BAR

[75] Inventor: Jack E. Smith, Dayton, Ohio

[73] Assignee: General Motors Corporation, Detroit, Mich.

[21] Appl. No.: 393,182

[22] Filed: Aug. 14, 1989

[51] Int. Cl.$^5$ .................... B60G 11/34; B60G 11/18; F16F 1/06; F16F 1/14
[52] U.S. Cl. .................... 267/25; 267/154; 267/155; 267/273
[58] Field of Search ............ 267/148, 149, 154, 155, 267/188, 189, 273, 275, 279, 25–27, 285; 280/662, 664, 665, 679, 684, 695, 700, 721, 723; 464/51, 54, 56–58, 155, 181, 182, 903, 97; 403/111, 229; 192/81 C; 188/82.1; 74/164

[56] References Cited

U.S. PATENT DOCUMENTS

| | | | |
|---|---|---|---|
| 3,239,207 | 3/1966 | Camossi | 267/154 |
| 3,263,984 | 8/1966 | Linn | 267/275 |
| 3,856,289 | 12/1974 | Steele | 267/154 |
| 4,781,364 | 11/1988 | Finn et al. | 267/273 X |

FOREIGN PATENT DOCUMENTS 0547574  2/1977  U.S.S.R. ............... 267/273

*Primary Examiner*—Robert J. Oberleitner
*Attorney, Agent, or Firm*—Ronald L. Phillips

[57] ABSTRACT

An end attachment assembly for a twisted rope torsion bar includes anchor nut, an elastomeric hub and a wrap spring adapted for cooperative interaction. The anchor nut provides strength and durability while the elastomeric hub provides resilience and elasticity to beneficially accept the angular deflection of the composite, twisted rope torsion bar when torque is applied. The elastomeric hub is molded onto the end of the torsion bar to improve its connection therewith. The torsion bar is preferably fabricated of a lightweight glass fiber-/epoxy composite material. In assembled relation, the nut and hub provide a substantially continuous, even cylindrical surface which cooperates with the wrap spring. The wrap spring tightly engages the nut and hub, securely maintaining the components in adjacent relation. The wrap spring constricts in the presence of applied torque, resulting in a tighter and tighter grip when influenced by increasing torque in a working environment. The constriction of the wrap spring compresses the elastomeric hub around the twisted rope torsion bar to reduce stress concentration at the attachment interface.

3 Claims, 2 Drawing Sheets

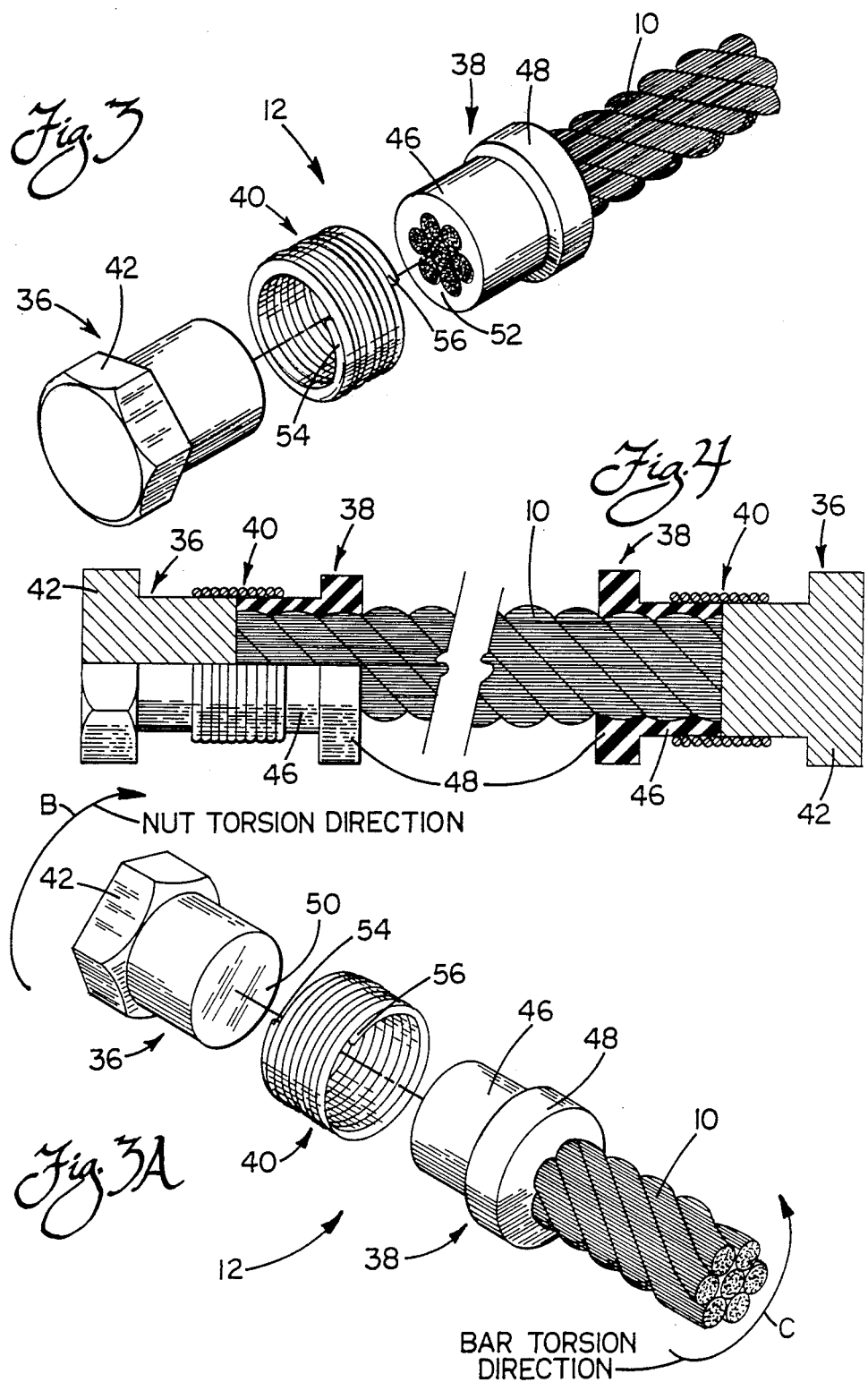

WRAP SPRING END ATTACHMENT ASSEMBLY FOR A TWISTED ROPE TORSION BAR

TECHNICAL FIELD

The present invention relates generally to an end attachment assembly for a torsion bar, and more particularly to an assembly specifically adapted for use with a torsion bar fabricated of lightweight resin coated glass fibers and formed in the shape of a twisted rope.

BACKGROUND OF THE INVENTION

Mechanical springs are widely used to serve a variety of functions, such as exerting a resilient force, providing flexibility, and storing and absorbing energy. One type of mechanical spring that has found many uses is a torsion bar.

In general, torsion bars are straight bars made of inherently resilient or elastic material, and designed to be subjected to torsional loading, i.e. twisting about its longitudinal axis. The torsion bar is usually solid and circular in cross-sectional configuration, but may also be of square or rectangular cross-section. Torsion bars have many applications; one well-known use being in automotive vehicle suspension systems.

Historically, torsion bars have been fabricated out of metal, such as steel. This provides the desired strength and durability, but does not provide the ideal resiliency due to its high modulus of elasticity. As the cost of component parts for automotive vehicles continues to rise and the need to save weight to meet governmental standards for improved gas mileage increases, the need arises to design a less expensive and lighter torsion bar. To compliment this goal, designers are continuing to create a torsion bar fabricated of a material with a low modulus of elasticity. A material found to meet the dual requirements of providing high elasticity and sufficient strength is a composite material made of resin coated glass fibers. The use of this material provides a lightweight product that is cost effective. A further advantage is that such a composite material alleviates the critical availability of metal alloys.

A problem has always existed in connecting torsion bars to any mass to be sprung due to the significant stresses existing at the connection regions. Thus, there is a need to improve the connection used in incorporating the new generation torsion bar fabricated of glass fiber-/epoxy composite material into the suspension system of a vehicle. Most of the operating components of a vehicle suspension system are fabricated of metal to provide strength. It is thus anticipated that opposing ends of a torsion bar would cooperate with metal components of significant strength and mass.

It is recognized that the desirable elasticity characteristic of a torsion bar providing the amount of deflection necessary to respond to vehicle motion conflicts with the strength requirement needed for use as attachments to the vehicle suspension system. The attachment component requires a high modulus of elasticity to introduce strength to the connection. Strength is inherently reduced when a torsion bar is required to have the necessary elasticity to perform its function.

One approach used in the art involves securing a torsion bar fabricated of composite material directly to a metal mounting piece. The torsion bar normally has a tubular configuration and is fitted into a tubular socket in the anchor. This type of direct attachment produces major problems since the torsion bar fabricated of composite material tends to deflect much more than the metal mounting piece when torque is applied, resulting in the tendency for a shear failure at the attachment interface.

As torsion bars are designed to be increasingly resilient, the attachment design becomes more critical. More specifically, an attachment design is desired to provide the required strength to the connection while mitigating the relative difference in angular deflection between the torsion bar and the attachment anchor. By alleviating the problems associated with the relative deflection difference, the stress concentration between the torsion bar and the anchor attachment is reduced, thus reducing the chance of failure of the torsion bar.

A further improvement in the design of torsion bars for automotive vehicle suspension systems and other uses has involved using a bundle of resin coated glass fibers formed into a rod-like shape. Several rod-shaped fiber bundles are then twisted together and set in to a rope-like configuration. This produces a twisted rope torsion bar fabricated of lightweight glass fiber/epoxy composite material incorporating the benefits of increased elasticity and resilience offered by the composite material with the higher load capacity offered by the twisted rope configuration. It should be appreciated that while the twisted rope configuration introduces benefits associated with elasticity and resilience, the improved design presents further complications with respect to the attachment component. The uneven non-circular surface of the twisted rope torsion bar increases the difficulty of providing a grip sufficient to allow optimal transmission of torque while minimizing the chance of shear failure at the attachment interface. An improved attachment design is thus needed to allow the twisted rope torsion bar to optimally cooperate with a metal mounting piece and at the same time maintain the reduced stress levels at the attachment interface.

SUMMARY OF THE INVENTION

Accordingly, it is a primary object of the present invention to provide an end attachment assembly for a twisted rope torsion bar allowing harmonious interaction between the twisted rope torsion bar and a sprung mass.

It is still another object of the present invention to provide an end attachment assembly including an elastomeric hub capable of being compressed radially inwardly with the application of increasing torque to the twisted rope torsion bar. In this way, the elastomeric hub is influenced to grip the torsion bar tighter as increased torque is introduced.

Still another object of the present invention is to provide an end attachment assembly for a twisted rope torsion bar capable of being integrally molded thereto to promote tight engagement with the non-circular surface of the twisted rope torsion bar.

It is another object of the present invention to provide an end attachment assembly for a twisted rope torsion bar including an elastomeric hub integrally molded onto the twisted rope torsion bar.

Another object of the present invention is to provide an end attachment assembly for a twisted rope torsion bar including a wrap spring designed to constrict in response to the application of torque to the twisted rope torsion bar and compress an elastomeric hub around the torsion bar.

It is an additional object to provide an end attachment assembly for a composite, twisted rope torsion bar designed to adjust compressively as the diameter of the torsion bar reduces with the application of increasing torque.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an end attachment assembly for a twisted rope torsion bar for use in springing a mass is provided. The end attachment assembly offers the desirable qualities of providing positive interaction between the twisted rope torsion bar and the sprung mass and stress reduction capability at the attachment interface.

Advantageously, the end attachment includes an anchor or end nut adapted to engage components of the sprung mass. Since the well-known use of a torsion bar is in an automotive vehicle suspension system, the description that follows focuses on that use. It should be appreciated, however, that the end attachment assembly can be successfully used to connect the twisted rope torsion bar for other applications.

The anchor nut of the assembly is designed to be secured to the vehicle suspension system so that it is retained in a substantially rigid position with respect to angular rotation. It is this rigid engagement that allows torque to be readily transmitted to or taken from the assembly by the torsion bar.

The end attachment assembly of the present invention is contemplated as being used with a torsion bar fabricated from resin coated and twisted glass fibers. The composite material used to fabricate the torsion bar affords increased elasticity and resilience due to its low modulus of elasticity. The twisted rope orientation of the torsion bar gives a desired degree of strength to the torsion bar. When installed in the working environment, such as in the vehicle suspension system, the torsion bar is preloaded by providing an initial twist sufficient to insure a positive spring action over the expected range of travel.

According to an important aspect of the invention, a hub is attached to the end of the torsion bar to facilitate a secure engagement. The hub cooperates with an anchor nut as will be hereinafter described. Advantageously, the hub is fabricated of an elastomeric material. The elastic nature of the hub is effective in receiving and dissipating the stresses normally associated with an interface attachment between the torsion bar and the attachment anchor. Thus, it is an important feature of this invention that the stress concentration at the attachment interface between the torsion bar and the attachment assembly is greatly minimized, resulting in an extended service life of both components. Additionally, the polymeric nature of the hub offers increased protection against frictional heat generated by the torque-influenced twisting between the torsion bar and the attachment assembly.

In a further effort to improve the functional relationship between the twisted rope torsion bar and the end attachment assembly, the elastomeric hub is integrally molded onto the torsion bar. This, presents a continuous and tight fit between the assembly and the torsion bar especially in view of the non-circular surface of the twisted rope torsion bar.

The presence of the elastomeric hub surrounding the outer contour of the twisted rope torsion bar reduces the problems associated with the difference in relative angular deflection. It can be appreciated that a composite torsion bar having a low modulus of elasticity deflects much more than an anchor nut having a high modulus of elasticity. When in direct contact in the presence of applied torque, stresses can build at the interface between the components to the point of causing catastrophic failure. The presence of the elastomeric hub on the outer contour of the torsion bar and its interacting relationship with the anchor nut significantly aids in preventing a failure between the attachment assembly and the composite torsion bar.

The anchor nut abuts the body of the elastomeric hub. The plane of contact between the anchor nut and the hub is perpendicular to the axis of the torsion bar. The anchor nut and the hub are designed such that the diameters defining their outer surfaces are substantially the same dimension. Thus, when placed in adjacency during assembly, the nut and the hub form a continuous, even cylindrical surface from the head of the nut to the collar of the hub at opposing ends of the assembly.

In accordance with a further aspect of the invention, a wrap spring overlaps the anchor nut and elastomeric hub and engages both components along a portion of their outer cylindrical surfaces. The wrap spring is advantageously of coiled design and is adapted to provide a tight, substantially even grip on both the anchor nut and the hub following assembly. It can be appreciated that the spring is preloaded by providing an initial wrap spring force to generate a positive gripping action on the nut and hub.

According to an important aspect of the invention, the wrap spring is designed to respond positively to the introduction of torque applied to the torsion bar. More specifically, the opposing ends of the coil curl in opposite directions when torque is transmitted between the torsion bar and the attachment assembly. This results in a constriction of the wrap spring around the anchor nut and elastomeric hub. The constriction not only provides a tighter grip exerted by the spring on the nut and hub when torque is applied, but also actively compresses the hub. It can be appreciated that the application of torque to the twisted rope torsion bar causes the diameter of the torsion bar to inherently decrease. Since the wrap spring responds by compressing the hub simultaneously, this action adequately compensates for the dimensional change of the torsion bar. The action also provides an even tighter grip after torque is applied while evenly distributing the compressive load over the outer fibers of the torsion bar. Additionally, the compression imparted to the elastomeric hub increases its torsional shear resistance. This further increases the functional efficiency of the assembly.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrates several aspects of the present invention and together with the description serves to explain the principles of the invention. In the drawing:

FIG. 3 is an enlarged exploded perspective view of the end attachment assembly according to this invention;

FIG. 3A is an enlarged exploded perspective view of the end attachment assembly according to this invention similar to FIG. 3, but shown from the opposite direction; and FIG. 4 is a side view of the torsion bar with the end attachment assemblies according to this invention at opposing ends broken away and in partial cross-section.

Reference will now be made in detail to the present preferred embodiment of the invention, an example of which is illustrated in the accompanying drawing.

DETAILED DESCRIPTION OF THE INVENTION

Figure 1:
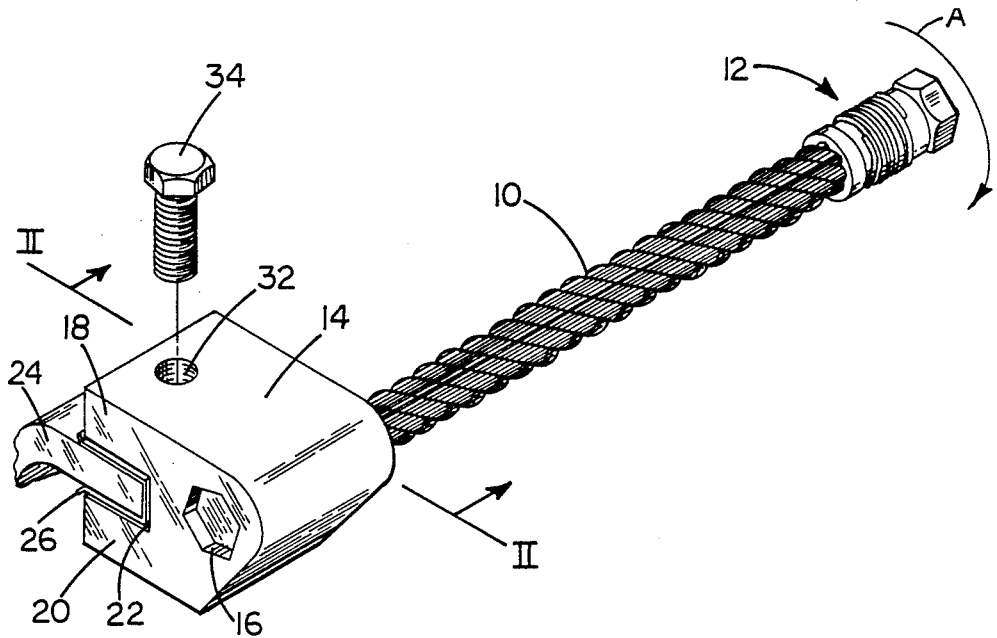
FIG. 1 is a perspective view of a twisted rope torsion bar attached at one end to a mounting block of a sprung mass and further showing at the opposite end an end attachment assembly according to this invention in full view.
Figure 2:
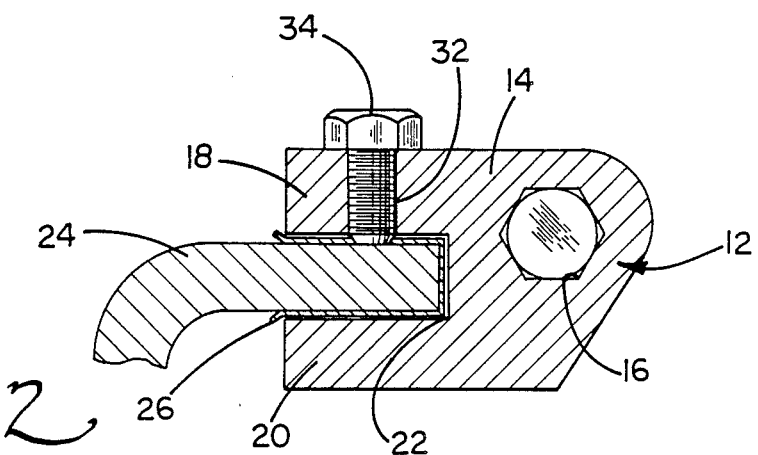
FIG. 2 is a cross sectional view taken generally along the plane indicated by lines II—II in FIG. 1.

Reference is now made to the drawing and particularly to FIG. 1 where a twisted rope torsion bar 10 appears as a component in a system for springing a mass, such as in a vehicle suspension system. An end attachment assembly, generally designated as 12, cooperates with the torsion bar 10 and serves to connect the torsion bar with another component of the system containing the sprung mass. The assembly 12 is shown securing the proximal end of the torsion bar 10 to a mounting block 14 having a mounting bore 16 that is cooperatively shaped. That is, the assembly 12 is hexagonally shaped to be retained within a hexagonal bore 16 in the mounting block 14, thus foreclosing relative rotation between the torsion bar 10 and the mounting block 14.

The mounting block 14 may take any suitable form, such as including upper and lower legs 18, 20 in spaced relation defining a slot 22 for cooperatively receiving a mounting web 24. A U-shaped clip 26 envelopes the mounting web 24 and assists in providing a secure engagement within the mounting block 14.

The mounting block 14 also includes a threaded aperture 32 adapted to receive a bolt 34. The force exerted by the base of the bolt 34 as the bolt 34 is threadingly tightened into the mounting block 14 provides further positive retention of the mounting web 24 within the slot 22.

Another end attachment assembly 12 is also shown in full perspective view attached to the opposite or distal end of the twisted rope torsion bar 10 in FIG. 1. It can be appreciated that if the distal end of the torsion bar 10 is attached to a support precluding any rotational movement, the load applied to the torsion bar 10 comes only from motion associated with the mounting web 24 at the proximal end of the torsion bar 10. The loading provided by the mounting web 24 is in one direction, such as counter to the weight and normal springing action of the vehicle. Advantageously in this situation, the torsion bar 10 is preloaded in the same direction as the anticipated applied torque. More specifically, during assembly, the torsion bar 10 is twisted beyond the zero torque or relaxed position. This provides the necessary support and the spring action over the full range of anticipated travel during use.

It can be visualized alternatively that the distal end attachment assembly 12 of FIG. 1 may be secured to another mounting block cooperating with a torque input means (not shown), thus imparting the torque depicted by action arrow A.

Reference is now made to FIGS. 3 and 3A where the preferred embodiment of the end attachment assembly 12 is more clearly shown. The end attachment assembly 12 includes an anchor or end nut 36, a hub 38 and a wrap spring 40. The anchor nut 36, hub 38 and wrap spring 40 cooperatively interact, as will be described in detail below, to transmit torque to or from the torsion bar 10. As indicated above, the input torque may be applied to either end of the bar. The interaction of these components prevents the critical build-up of stresses at the end of the torsion bar 10 that could otherwise lead to failure.

Conventional end attachment assemblies utilize a metal anchor having a high modulus of elasticity to provide strength to the connection. The anchor normally includes a bore for receiving a torsion bar having a low modulus of elasticity to provide resilience in an attempt to adequately perform its function. It can be appreciated that following assembly and when torque is applied in the working environment, the torsion bar deflects to a much greater extent than the metal anchor. This creates a concentration of stresses at the attachment interface between the torsion bar and the metal anchor, possibly leading to torsion bar failure.

The relative deflection difference is increased when the torsion bar is fabricated of a fiber glass/epoxy composite material providing greater elasticity and resilience. Thus, it can be seen that the connection between the attachment assembly and the torsion bar becomes even more critical. The end attachment assembly 12 according to this invention provides the beneficial strength requirement for durability, while cooperatively responding to the elasticity and resilience of the composite, twisted rope torsion bar to reduce the stress concentration at the attachment interface.

More specifically, the anchor nut 36 is formed of metal, whose high modulus characteristic introduces strength to the attachment assembly 12. The nut 36 has a head 42 for cooperatively seating within the mounting bore 16 of the mounting block 14. Advantageously, the nut 36 does not directly receive the torsion bar 10 within its interior.

According to an important aspect of the invention, the hub 38 is designed to receive the torsion bar 10. The hub 38 is fabricated of elastomeric material. The use of elastomeric material provides a dual advantage in that it is sufficiently resilient to safely transmit torque while reducing the stresses that would normally build up at the interface between the end attachment assembly 12 and the torsion bar 10. Additionally, the hub 38 simultaneously aids in protecting against the frictional heat generated as a result of the relative twisting movement between the attachment assembly and the bar.

In order to provide a positive and optimal engagement, the elastomeric hub 38 is integrally molded onto the end of the torsion bar 10. An extremely secure bond is formed between the hub 38 and the torsion bar 10 fabricated of composite material due to the positive bonding characteristic common to both components when pressed together in the presence of sufficient heat. The bond is enhanced due to the non-circular uneven surface contact between the hub 38 and the torsion bar 10. The bond thus formed eliminates the possibility of slippage between the hub 38 and the torsion bar 10 during the application of torque.

The elastomeric hub 38 includes a body 46 and a collar 48. The body 46 of the hub 38 is designed to abut the anchor nut 36. The abutting end face surfaces are shown in FIGS. 3A and 3 as faces 50 and 52, respectively. The plane of abutment at faces 50, 52 is perpendicular to the axis of the torsion bar 10. Advantageously, the diameters defining the outer surfaces of the nut 36 and the hub body 46 are substantially the same. Thus, upon abutment during assembly, a continuous, even cylindrical surface extends from the head 42 of the nut 36 to the collar 48 of the hub 38.

According to an important aspect of the invention, the wrap spring 40 overlaps the anchor nut 36 and the body 46 of the elastomeric hub 38. In the preferred embodiment of the invention, the wrap spring 40 takes the form of a coiled wire fabricated of a composite material having high elasticity and resilience. It can be appreciated, however, that the wrap spring 40 may be a metal member, such as steel.

Referring to FIG. 4, it can be seen that the diametral equivalence of the anchor nut 36 and the body 46 of the elastomeric hub 38 provides an even surface for the wrap spring 40 to engage. This maximizes the working action of the spring 40 and prevents unnecessary stress build-up in the spring 40 due to uneven bending. It can be appreciated that the spring 40 is preloaded with an initial wrap spring force to provide firm grip on the nut 36 and the body 46 of the hub 38 following assembly.

As a further important aspect of the invention, the wrap spring 40 is designed to positively respond when torque is applied to the torsion bar 10. More specifically, the twisting action imparted to the wrap spring 40 in response to the twisting of the torque-influenced torsion bar causes ends 54, 56 of the spring 40 to curl in opposite directions. This causes the spring 40 to constrict and clamp around the nut 36 and the body 46, providing a tighter and tighter grip proportional to the application of torque.

Referring again to FIG. 3A, it can be visualized that the end of the torsion bar 10 (not shown) as being attached to a support precluding rotational motion. When torque is applied to the anchor nut 36 (as shown by action arrow B), the torsion bar 10 resists the twisting force through the interaction of the attachment assembly 12, inducing an opposing resisting force (as shown by action arrow C). The opposing twisting force sets up a twisting moment defining the energy storage capability of the torsion bar. In the same manner, the application of a twisting force to one of the ends 54 of the wrap spring 40 causes an oppositely directed twisting force in resistance at the opposing end 56 of the wrap spring 40. This results in the beneficial constriction action.

It can be appreciated that the application of torque inherently tends to reduce the diameter of the twisted rope torsion bar 10. The narrowing of the torsion bar diameter along the connected surface of interface with the hub 38 tends to impart a force trying to disrupt the bond between the two components.

The advantage provided by the wrap spring 40 in conjunction with the elastomeric nature of the hub 38 counteracts this bond disruption force. More specifically, the constriction of the wrap spring 40 in response to applied torque causes it to compress the elastomeric hub 38 radially inwardly at the same time. This compression in response to applied torque not only compensates for the diametral change of the torsion bar 10 but also imparts a positive tighter grip on the torsion bar 10. The compressive action of the hub 38 reduces the stress build-up at the attachment interface between the torsion bar 10 and hub 38, eliminating the primary cause of failure of the torsion bar 10 at the interface. More specifically, the hub 38 acts to evenly distribute the compressive force exerted on the outer fibers of the torsion bar 10 by the constriction of the wrap spring 40 in response to increasing torque. The compressive action also advantageously increases the torsional shear resistance of the hub 38 itself. The dual benefit provided by this design significantly increases the operating life of both the end attachment assembly 12 and the torsion bar 10.

In summary, numerous benefits result from employing the concepts of the present invention. The end attachment assembly 12 employs an anchor nut 36 to provide strength and durability in combination with an elastomeric hub 38 to facilitate the connection with the twisted rope torsion bar 10. The hub 38 is molded onto the end of the torsion bar 10 to improve the integrity of the connection. The wrap spring 40 surrounds the nut 36 and hub 38, overlapping and tightly engaging and connecting the outer surface of the two components. Advantageously, the wrap spring 40 positively responds to the application of torque by constricting around the nut 36 and hub 38, providing a tighter engagement while beneficially compressing the elastomeric hub 38 around the torsion bar 10. The improved design provides a secure elastic connection between the attachment assembly 12 and the torsion bar 10 so that stress concentrations do not reach the critical point at the interface and thus eliminates a significant potential cause of failure.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. An end attachment assembly for a twisted rope torsion bar, comprising:
    anchor means for connection to a mounting means of a sprung mass;
    means for receiving said twisted rope torsion bar including an attachment interface; and
    spring means engaging said anchor means and said receiving means, said spring means positively responding to applied torque so as to constrict around said anchor means and said receiving means, whereby secure engagement is continuously maintained between said anchor means and said twisted rope torsion bar to reduce the stress concentration at the attachment interface, and separation of said attachment assembly from said torsion bar is prevented.

2. An end attachment assembly for a twisted rope torsion bar, comprising:

an anchor nut for connection to a mounting means of a sprung mass;

means for receiving said twisted rope torsion bar at an attachment interface, including an elastomeric hub; and means for compressing said twisted rope torsion bar adjacent said anchor means when torque is applied, including a wrap spring surrounding said anchor nut and said elastomeric hub and positively responding to applied torque to constrict around said hub, whereby secure engagement is continuously maintained between said anchor means and said twisted rope torsion bar to reduce the stress concentration at the attachment interface, and separation of said attachment assembly from torsion bar is prevented.

3. A wrap spring end attachment assembly in combination with a twisted rope torsion bar, comprising:

an anchor nut connecting to a mounting means for a sprung mass;

means for receiving said twisted rope torsion bar at an attachment interface, including an elastomeric hub integrally molded onto the end of said twisted rope torsion bar;

said anchor nut and said elastomeric hub being adapted to abut one another in planar relation to form a substantially continuous even cylindrical surface; and a wrap spring for securely engaging and maintaining said anchor nut and said elastomeric hub in abutment relation;

said wrap spring being adapted to constrict when twisted so as to compress said twisted rope torsion bar when torque is applied;

whereby secure engagement is continuously maintained between said end attachment and said twisted rope torsion bar to reduce the stress concentration at the attachment interface, and separation of said attachment assembly from said torsion bar is prevented.

* * * * *